United States Patent [19]

Ishimura et al.

[11] Patent Number: 4,477,610
[45] Date of Patent: Oct. 16, 1984

[54] AQUEOUS DISPERSION COMPOSITIONS

[75] Inventors: Hidekazu Ishimura; Yoshimi Kakutani; Naohisa Aoyagi, all of Shizuoka, Japan

[73] Assignee: Asahi Kasei Kogyo Kabushiki Kaisha, Osaka, Japan

[21] Appl. No.: 333,506

[22] Filed: Dec. 22, 1981

[30] Foreign Application Priority Data

Dec. 23, 1980 [JP] Japan ............................ 55-182669
Feb. 24, 1981 [JP] Japan ............................ 56-24854
Feb. 24, 1981 [JP] Japan ............................ 56-24855

[51] Int. Cl.$^3$ ............................................ C08L 63/10
[52] U.S. Cl. .................................... 523/414; 523/409
[58] Field of Search ............... 523/406, 407, 409, 410, 523/414; 526/273

[56] References Cited

U.S. PATENT DOCUMENTS

| | | | |
|---|---|---|---|
| 3,835,076 | 9/1974 | Jeffrey | 523/407 |
| 3,969,300 | 7/1976 | Nagata | 523/407 |
| 3,976,615 | 8/1976 | Sekmakas | 523/414 |
| 4,075,148 | 2/1978 | Zatmann | 523/409 |
| 4,104,230 | 8/1978 | Chang | 523/409 |
| 4,151,131 | 4/1979 | Sekmakas | 523/407 |
| 4,212,776 | 7/1980 | Martinez | 523/414 |
| 4,244,850 | 1/1981 | Mylonakis | 523/407 |
| 4,251,415 | 2/1981 | Nakada | 523/414 |

Primary Examiner—Paul R. Michl
Attorney, Agent, or Firm—Sughrue, Mion, Zinn, Macpeak & Seas

[57] ABSTRACT

An aqueous dispersion composition is described, which is prepared by uniformly mixing (A) a mixture of aromatic compounds having an average of at least 0.5 epoxy groups and from 0.1 to 1.5 acryloyl or methacryloyl groups in the molecule, and (B) at least one ethylenic monomer, and then polymerizing the mixture. In other embodiments, the composition can contain a polyamine-based hardener, and additionally, a resin, e.g., a phenol resin and a terpene resin. This composition has excellent storage stability and can provide a coating film having excellent water resistance, heat resistance, and adhesiveness.

21 Claims, No Drawings

4,477,610

AQUEOUS DISPERSION COMPOSITIONS

FIELD OF THE INVENTION

The present invention relates to aqueous resin compositions having excellent properties as a basic composition for the preparation of paints, adhesives, and so forth.

BACKGROUND OF THE INVENTION

In recent years, aqueous polymer dispersions prepared by emulsion polymerization, for example, of acrylonitrile-styrene, vinyl acetate, ethylene-vinyl acetate, and the like have been increasingly used as paints, adhesives, and so forth. These conventional aqueous polymer dispersions, however, have a serious problem in that they can only provide coating films which exhibit poor adhesion to metals, wood, cement-hardened products, plastics, and so forth, and which are often subject to peeling and blistering, particularly under wet conditions or at high temperatures. In order to solve the problem, several attempts, such as reducing the amount of water-sensitive substances, e.g., surface active agents and protective colloids, contained in the aqueous polymer dispersion, and formation of a cross-linked structure by the introduction of functional groups into the polymer skeleton (see U.S. Pat. Nos. 3,991,216, 4,065,415, 4,065,416 and 4,097,438), but with insufficient effects.

In addition, an attempt to improve the water resistance of coating film by addition of thermosetting resins, such as epoxy resins, in combination has been made (see Japanese Patent Application (OPI) No. 78237/78) (the term "OPI" as used herein refers to a "published unexamined Japanese patent application"). This method, however, suffers from disadvantages in that the epoxy resin separates from the polymer component during storage, coating films obtained become turbid, and the water resistance of the coating film is insufficiently improved.

In order to overcome the above-described defects, Japanese Patent Application (OPI) No. 1228/78, for example, has disclosed a method in which an epoxy resin is grafted onto a carboxy group-containing acryl polymer to prepare a graft copolymer having a selfemulsification capability, and the graft copolymer is dispersed in water. This method also suffers from disadvantages in that the graft efficiency is poor, and therefore the grain size of the graft copolymer to be dispersed in water is large, making it difficult to control the flow and extension of the resultant dispersion product. Furthermore, the water dispersion stability is poor unless the ionization ratio of the carboxy group is high.

It has therefore been desired to develop aqueous dispersion compositions which overcome the above-described defects of the prior art technique, and provide coating films having excellent water resistance, solvent resistance, and physical properties.

Industrial adhesives which are now widely used are generally thermosetting resin-based and emulsion-based adhesives. Non-solvent type adhesives have also long been used. Adhesives prepared using chloroprene rubber as a starting material are almost all solvent type adhesives, and therefore, in view of safety and sanitation, it is strongly desired to produce aqueous chloroprene rubber-based adhesives.

Solvent type adhesives prepared using chloroprene rubber have advantages in that the contact properties are good, the initial adhesive force is strong (because of high crystallinity), and the heat resistance and water resistance are good. Thus, they have many uses, for example, in wood-working and automobile production. Emulsion type adhesives are inferior in the initial adhesive force, heat resistance, and water resistance compared to the solvent type adhesives. In order to overcome these defects, therefore, various proposals have been made, but satisfactory adhesives have not yet been obtained.

SUMMARY OF THE INVENTION

The principal object of the invention is to provide aqueous dispersion compositions which have good storage stability, can be easily controlled in the flow and extension properties thereof when applied to an article to be coated since the grain size of emulsion can be freely controlled, and which can provide a uniform coating film having a good water resistance, heat resistance, and adhesive force.

The present invention, therefore, is an aqueous dispersion composition which is prepared by uniformly mixing (A) a mixture of aromatic compounds having epoxy groups and/or acryloyl or methacryloyl groups, said mixture containing an average of at least 0.5 epoxy groups and an average of from 0.1 to 1.5 acryloyl or methacryloyl groups per molecule, and (B) at least one ethylenic monomer, and then polymerizing the mixture.

DETAILED DESCRIPTION OF THE INVENTION

Some of the major advantages of the aqueous dispersion composition of the invention are as follows:

(1) It can provide a coating film having excellent water resistance, heat resistance, and adhesiveness compared with conventional aqueous dispersions, exemplified by an acryl-based dispersion.

(2) It has excellent storage stability compared with conventional aqueous dispersions, such as an epoxy resin-based aqueous dispersion and an epoxy resin-acryl resin-based dispersion.

(3) It can provide a transparent coating film having improved water resistance.

(4) Since the grain size at the time of being dispersed in water is small, it is easy to control the flow and extension properties of the dispersion when applied to an article to be coated.

(5) The water dispersion stability is good even though the ionization ratio of the carboxy group is low.

(6) It can provide a coating film having good initial adhesive force, i.e., good contact properties.

(7) With a lapse of time, the cross-linking reaction between the epoxy group and hardener remaining in the dispersion proceeds, providing higher adhesive force, and heat resistance and water resistance which are higher than those of conventional chloroprene-based adhesives.

Hereinafter the invention will be explained in more detail.

A mixture containing an average of at least 0.5 epoxy groups and an average of from 0.1 to 1.5 acryloyl or methacryloyl groups per molecule which can be used in the invention is composed of aromatic compounds having epoxy groups and/or acryloyl or methacryloyl groups (hereinafter these aromatic compounds are referred to be "polymerizable epoxy compounds"), and includes, for example, epoxy acrylate or epoxy methacrylate mixtures resulting from the reaction of aromatic epoxy resins and acrylic or methacrylic acid or derivatives thereof.

Examples of aromatic epoxy resins are condensates of polyhydric phenols (such as dihydric phenols, e.g., catechol, resorcin, hydroquinone, bisphenol A, etc., and trihydric phenols, e.g., pyrogallol, chloroglycine, hydroxyhydroquinone, etc.) and epihalohydrin. Most typical is the condensate of bisphenol A and epichlorohydrin.

When the epoxy group content is less than 0.5 per molecule, the water resistance, heat resistance, and adhesiveness of the coating film formed therefrom are poor.

When the acryloyl or methacryloyl group content is less than 0.1, the storage stability is poor and the coating film formed is turbid. On the other hand, when it is more than 1.5, gelation occurs during preparation of the desired polymer. This is not suitable for practical use. The number of acryloyl or methacryloyl groups per molecule is particularly important. As the number is increased, the grain size of the aqueous dispersion is reduced, and the aqueous dispersion is stabilized, whereas the viscosity of the polymer is increased, finally resulting in gelation. Preferably, the number of acryloyl or methacryloyl groups per molecule is from 0.4 to 0.8.

The epoxy group content and the acryloyl or methacryloyl group content can be measured by a perchloric acid method as described in, for example, Hashimoto, *Epoxy Resins*, p. 52, published by Nikkan Kogyo Shinbunsha, and a pyridine dibromosulfate method as described in, for example, *Kobunshi Jikkengaku Koza No. 9*, p. 128, respectively.

The epoxy equivalent of the mixture of the polymerizable epoxy compounds is not critical, and it is usually within the range of from 100 to 10,000, preferably from 100 to 2,000.

Ethylenic monomers which can be used in the invention include acrylic acid and methacrylic acid, alkyl acrylates such as methyl acrylate, ethyl acrylate, propyl acrylate, butyl acrylate and 2-ethylhexyl acrylate, alkyl methacrylates corresponding to the above alkyl acrylates, aromatic vinyl compounds such as styrene, α-methylstyrene and vinyltoluene, mono- or diesters of α,β-ethylenically unsaturated dicarboxylic acids such as mono- or dibutyl maleate and mono- or dioctyl fumarate, vinyl esters such as vinyl acetate and vinyl propionate, vinyl ethers, unsaturated nitriles such as acrylonitrile and methacrylonitrile, olefins such as ethylene, butadiene and isoprene, and chlorine-containing vinyl compounds such as vinyl chloride, vinylidene chloride and chloroprene.

These ethylenic monomers can be used, if desired, in combination with functional or cross-linkable monomers. Examples of such functional or cross-linkable monomers include hydroxy group-containing monomers such as 2-hydroxyethyl acrylate, 2-hydroxyethyl methacrylate and polyethylene glycol monomethacrylate, amido group-containing monomers such as acrylamide and methacrylamide, methylol group-containing monomers such as N-methylol acrylamide and dimethylol acrylamide, alkoxymethyl group-containing monomers such as N-butoxymethyl acrylamide, epoxy group-containing monomers such as glycidyl acrylate and glycidyl methacrylate, and divinyl monomers such as divinylbenzene, polyoxyethylene diacrylate and polyoxyethylene dimethacrylate.

Preferably, acrylic acid or methacrylic acid comprises from about 1% to 60% by weight of the total ethylenic monomer content. This acrylic acid or methacrylic acid can provide water dispersibility due to carboxy anions which are obtained by the neutralization thereof, and provides the carboxyl group, which is used for the cross-linking reaction with the residual epoxy group.

The ratio of the mixture of polymerizable epoxy compounds to the ethylenic monomer can be easily determined, depending on the particular properties desired. Preferably from 10 to 90 parts by weight of the mixture of polymerizable epoxy compounds is added to from 90 to 10 parts by weight of the ethylenic monomer.

The aqueous dispersion of the invention can be prepared by mixing uniformly (A) the mixture of polymerizable epoxy compounds and (B) the ethylenic monomer, and polymerizing by addition of a polymerization initiator, and, if necessary, other additives such as a surface active agent and an organic solvent.

A method of polymerizing the mixture of (A) and (B) is not critical, and any method which is generally known can be employed. In particular, a solution polymerization method and an emulsion polymerization method are preferred.

In the case of the solution polymerization, any organic solvent can be used. In particular, hydrophilic organic solvents are preferred. Examples are alkyl alcohols such as methanol, ethanol, propanol and butanol, ether alcohols such as methyl cellosolve, ethyl cellosolve, propyl cellosolve, butyl cellosolve, methyl carbitol and ethyl carbitol, and ether esters such as methyl cellosolve acetate and ethyl cellosolve acetate.

Polymerization initiators which can be used include peroxides, persulfates, azobis compounds, and redox systems thereof with reducing agents such as iron (II) or chromium ion, sulfites and hydrazine.

In the case of the emulsion polymerization, a surface active agent, a dispersant, a protective colloid, water, and a polymerization initiator are added to (A) and (B) to prepare an emulsified dispersion, and then, emulsion polymerization is performed. Surface active agents, dispersants, and protective colloids which can be used include aliphatic soaps, alkyl sulfate salts, alkylbenzenesulfonate salts, dialkylsulfosuccinate salts, alkyl phosphate salts, polyoxyethylene alkyl ethers, polyoxyethylene alkylphenol ethers, polyoxyethylene aliphatic acid esters, sorbitan aliphatic acid esters, polyoxyethylene sorbitan aliphatic acid esters, glycerin aliphatic acid esters, oxyethylene-oxypropylene block copolymers, alkylamine salts, polyphosphoric acid salts, polyacrylic acid salts, maleic anhydride copolymer salts, polyvinyl alcohol, and hydroxyethyl cellulose.

Polymerization initiators for the ethylenic monomers which can be used include, for example, persulfate salts, peroxides, azobis compounds, and redox systems thereof with reducing agents. If necessary, pH adjustors, such as sodium hydrogenphosphate and sodium hydrogencarbonate, and organic solvents are added.

Any polymerization method is performed by addition of the above-described polymerization initiator. It is preferred to maintain the polymerization temperature within the range of from 70° C. to 100° C. At temperatures lower than 70° C., the polymerization time is too long, whereas at temperatures higher than 100° C., gelation may occur during the polymerization.

Water-dispersion is performed as follows:

(1) A basic compound is added to the polymer in such an amount as to neutralize, partially or entirely, the carboxyl groups contained therein, and uniformly mixed with stirring. Thereafter, a predetermined amount of water is added to the mixture. For instance, the water is added such that viscosity of the water-dispersion is from 100 to 1,000 cps for the purpose of paints and from 100 to 10,000 cps for the purpose of adhesives. Basic compounds which can be used for the neutralization include amines such as monomethylamine, monoethylamine, dimethylamine, diethylamine, trimethylamine, triethylamine, monomethanolamine, dimethanolamine, trimethanolamine and dimethylaminoethanol, and inorganic basic compounds such as caustic soda and caustic potash.

(2) In the case of the emulsion polymerization, it is not necessary to consider the water-dispersion, since the polymer can be prepared in an aqueous medium.

In the aqueous dispersion composition of the invention, it is necessary that the epoxy group remains therein in an amount sufficient to cause the cross-linking reaction.

Addition of cross-linking agents, i.e., compounds having functional groups capable of reacting with an epoxy group or alcoholic hydroxy groups resulting from the reaction of the epoxy group, for example, a primary amino group, a secondary amino group, a carboxy group, an acid anhydride group, a hydroxy group, a sulfide group, a methylol group, and an isocyanate group, to the aqueous dispersion composition of the invention provides a good coating film. In addition, the introduction of the above functional groups into the ethylenic monomer permits the production of good coating film.

Under drying conditions of from room temperature to 80° C., amine compounds are particularly effective. Suitable examples of such amine compounds are polyamines which are known as hardeners for epoxy resins, such as aliphatic polyamines, e.g., ethylenediamine, diethylenetriamine and triethylenetetramine, alicyclic polyamines, e.g., isophoronediamine, menthandiamine and N-aminoethylpiperadine, aromatic amines, e.g., xylylenediamine, phenylenediamine, diaminodiphenylmethane and diaminodiphenylsulfone, heterocyclic ring-containing polyamines, modified polyamines prepared from the above polyamines, polyamidopolyamines synthesized from natural or synthetic dicarboxylic acids and polyamines such as ethylenediamine, tertiary amine-containing compounds, e.g., dimethylbenzylamine and 2,4,6-tridimethylaminomethylphenol, imidazoles, and dicyandiamides. Further, polysulfide-based hardeners are effectively used alone or in combination with the polyamine-based hardeners, such as those having the structure, $HS-(C_2H_4-O-CH_2-O-C_2H_4-S-S)_n-C_2H_4-O-CH_2-O-C_2H_4-SH$ (n = 2~10).

The polyamine-based hardeners or polysulfide-based hardeners are preferably added in such an amount that the active hydrogen (i.e., the hydrogen bonded to nitrogen or sulfur atom) of the hardener is from 0.1 to 2.0 equivalents per equivalent of epoxy group in the aqueous dispersion of the present invention. When it is less than 0.1 equivalent, sufficient adhesive strength cannot be obtained, and when it is more than 2.0 equivalents, water resistance is deteriorated.

When the drying can be performed at temperatures higher than 100° C., carboxyl group-containing ethylenic monomers, amino resins, phenol resins, and blocked isocyanates (which are reactive to hydroxy or amino group at high temperature (120°–200° C.) but stable at room temperature) can be used.

The solids content of the aqueous dispersion composition of the invention can be increased up to about 80% by weight. In view of quality and productivity, however, it is preferred that the solids content is from about 15 to 60% by weight.

To the aqueous dispersion composition of the invention there can be added a bulk filler, a reinforcing agent, a filler, and a pigment, depending on the particular purposes for which it is to be used. Examples of such additives include coal tar, glass fiber, asbestos fiber, boron fiber, carbon fiber, cellulose, polyethylene powder, polypropylene powder, quartz powder, mineral silicates, e.g., mica, asbestos powder and slate powder, kaolin, aluminum oxide trihydrate, aluminum hydroxide, chalk powder, gypsum, calcium carbonate, antimony trioxide, bentone, silica aerosol, lithopone, baryta, titanium dioxide, carbon black, graphite, oxide colored pigments, e.g., iron oxide, and metal powders, e.g., aluminum powder and iron powder.

Where a high initial adhesive force is required, a tackifier, e.g., a phenol resin, a terpene resin, a rosin gum, a rosin ester resin, and a xylene resin, can be added to the aqueous dispersion composition in order to improve the contact properties thereof. Preferably, the tackifier is added in the form of an aqueous dispersion or aqueous solution. The amount of the tackifier added is preferably from 5 to 100 parts by weight per 100 parts by weight of the total weight of the polymer of ethylenic monomers and the epoxy compound.

In order to improve the adhesive force of the aqueous dispersion composition to glass, etc., silane-based compounds, such as vinyltriethoxysilane and β-(2,4-epoxycyclohexyl)ethyltrimethoxysilane, can be added thereto.

The aqueous dispersion composition of the invention can be used as a paint varnish for the dispersion of pigment, a clear paint for metallic articles exemplified by a can, a colored paint in which pigment is used in combination therewith, a wall spraying material, a floor material, a paint for coating a swimming pool, an aqueous emulsion paint, exemplified by a road paint, or like coating material, a print ink composition, or a fiber-processing agent. In addition, the aqueous dispersion composition can be used to bond wood, plywood, particle board, gypsum board, metals, e.g., iron and aluminum, plastic films, plastic molds, leather, cloth, e.g., cotton and flax, glass fiber, glass cloth, and fiber reinforced plastics (FRP), to one another or to different products.

Illustrative formulations of the aqueous dispersion composition which can be used for paints for metallic articles and adhesives are given below.

|  | Formulation for Paints for Metallic Articles | Formulation for Adhesives |
|---|---|---|
| (A) Mixture of Aromatic Compound | A.E.R.-669*/Methacrylic Acid (molar ratio: 1/0.5–1/0.3 | A.E.R.-330*/Methacrylic Acid (molar ratio: 1/0.4–1/0.05) |
| Average Epoxy Content | 1.5–1.7 | 1.6–1.95 |

| | Formulation for Paints for Metallic Articles | Formulation for Adhesives |
|---|---|---|
| Average (Meth)acryloyl Content | 0.3-0.5 | 0.1-0.4 |
| Epoxy Equivalent | 3,500-5,000 | 190-400 |
| Amount of (A) | 60-90 (parts) | 20-80 (parts) |
| (B) Ethylenic Monomer | | |
| Styrene | 10-60 (%)** | 0-50 (%) |
| Methacrylic Acid | 10-60 (%) | 1-10 (%) |
| Methyl Methacrylate | None | 1-80 (%) |
| Ethyl Acrylate | 1-20 (%) | None |
| n-Butyl Acrylate | 1-30 (%) | 1-80 (%) |
| 2-Ethylhexyl Acrylate | None | 1-80 (%) |
| Amount of (B) | 40-10 (parts) | 80-20 (parts) |
| Polymerization | Solution Polymerization | Emulsion Polymerization in the Presence of Nonionic or Anionic Surface Active Agents |
| Hardener | None, or Dicyandiamides (0.1-5 parts), or Amino Resins (1-30 parts) | Imidazoles |
| Basic Compound | Amines | None |
| Tackifier | None | Aqueous Dispersion of Phenol Resins |
| Water Added | Yes | No Need |

Note:
*A.E.R.-669 and A.E.R.-330 are epoxy resins produced by Asahi Kasei Kogyo Kabushiki Kaisha.
**Based on the total amount of the ethylenic monomers.

The following examples are given to illustrate the invention in greater detail. All parts and percents (%) are by weight.

PREPARATION EXAMPLE 1

Synthesis of Polymerizable Epoxy Group-Containing Compound Mixture A

Ninety five parts of a bisphenol A type epoxy resin A.E.R.-664 (produced by Asahi Kasei Kogyo Kabushiki Kaisha (hereafter "Asahi Kasei")) having a epoxy equivalent of 950 was dissolved in 40 parts of ethyl cellosolve. Then, 0.02 part of sodium hydroxide (NaOH) was added to the solution along with 1 part of water, and the temperature of the resulting mixture was raised to 120° C. Subsequently, 4.3 parts of methacrylic acid was added to the mixture over a period of about 2 hours, and the temperature was maintained at 120° to 130° C. When the acid value reached 0.5 or less, the reaction was stopped.

The reaction product was a mixture of compounds having an average of one epoxy group and one methacryloyl group in the molecule and the epoxy equivalent of 1,000. This is called "Polymerizable Epoxy Group-Containing Compound Mixture A".

PREPARATION EXAMPLE 2

Synthesis of Polymerizable Epoxy Group-Containing Compound Mixtures B and C

Polymerizable Epoxy Group-Containing Compound Mixtures B and C were prepared in the same manner as in Preparation Example 1, except that the amount of methacrylic acid added was changed to 17.2 parts and 60.2 parts, respectively.
Polymerizable Epoxy Group-Containing Compound B had an average of 1.6 epoxy groups and 0.4 methacryloyl groups per molecule and the epoxy equivalent of 1,210, and Polymerizable Epoxy Group-Containing Compound Mixture C, an average of 0.6 epoxy groups and 1.4 methacryloyl groups per molecule and the epoxy equivalent of 6,700.

PREPARATION EXAMPLE 3

Synthesis of Polymerizable Epoxy Group-Containing Compound Mixture D

Polymerizable Epoxy Group-Containing Compound Mixture D was prepared in the same manner as in Preparation Example 1 except that 200 parts of a bisphenol A type epoxy resin A.E.R.-667 (produced by Asahi Kasei) having an epoxy equivalent of 2,000 was used in place of the epoxy resin A.E.R.-664, and 1.72 parts of methacrylic acid was used.
Polymerizable Epoxy Group-Containing Compound Mixture D had an average of 1.6 epoxy groups and 0.4 methacryloyl groups per molecule and the epoxy equivalent of 1,600.

PREPARATION EXAMPLE 4

Synthesis of Polymerizable Epoxy Group-Containing Compound Mixture E

Ninety five parts of a bisphenol A type epoxy resin A.E.R.-664 was dissolved in 20 parts of toluene, and 0.02 part of $CH_3ONa$ was added to the solution. The temperature of the resulting mixture was raised to 115° C. Then, 3.6 parts of acrylic acid was added to the mixture over a period of about 1 hour, and heated under reflux of toluene for about 3 hours. At the end of the time, the acid value decreased to 0.5 or less, and the reaction was completed. Subsequently, 95% or more of the charged toluene was distilled away from the reaction solution under reduced pressure, and 40 parts of butyl cellosolve was added to the residue to obtain Polymerizable Epoxy Group-Containing Compound Mixture E.
Polymerizable Epoxy Group-Containing Compound Mixture E had an average of 1 epoxy group and 1 acryloyl group per molecule and the epoxy equivalent of 1,030.

PREPARATION EXAMPLE 5

Synthesis of Polymerizable Epoxy Group-Containing Compound Mixture F

To 136.7 parts of Polymerizable Epoxy Group-Containing Compound Mixture B prepared in Preparation Example 2 was added 9 parts of para-tert-butylphenol, and they were reacted at 130° C. for 3 hours to prepare Polymerizable Epoxy Group-Containing Compound Mixture F.

PREPARATION EXAMPLE 6

Synthesis of Polymerizable Epoxy Group-Containing Compound Mixture G

To 19.5 parts of a bisphenol A type epoxy resin A.E.R.-331 (produced by Asahi Kasei) having an epoxy equivalent of 190 was added 0.5 part of NaOH together with 1 part of water, and the mixture was heated up to 120° C. Then, 1.7 parts of methacrylic acid was added to the mixture over a period of about 1 hour, and the temperature of the resulting mixture was maintained at 120° to 130° C. When the acid value reached 1 or less, the reaction was stopped.

The thus-prepared compound had an average of 1.6 epoxy groups and 0.4 methacryloyl groups per molecule and the epoxy equivalent of 260. This compound was designated as "Polymerizable Epoxy Group-Containing Compound Mixture G".

PREPARATION EXAMPLE 7

Synthesis of Polymerizable Epoxy Group-Containing Compound Mixture H

In the same manner as in Preparation Example 6, except that a bisphenol F type epoxy resin having an epoxy equivalent of 160 was used in place of the bisphenol A type epoxy resin, Polymerizable Epoxy Group-Containing Compound Mixture H, having an average of 1.6 epoxy groups and 0.4 methacryloyl groups per molecule and the epoxy equivalent of 203 was obtained.

PREPARATION EXAMPLE 8

Synthesis of Polymerizable Epoxy Group-Containing Compound Mixture I

To 17 parts of a novolak type epoxy resin (DEN-438, produced by Dow Chemical Co.) having an epoxy equivalent of 170 were added 0.5 part of NaOH together with 1 part of water, and the mixture was heated up to 120° C. Then, 3.6 parts of acrylic acid was added to the mixture over a period of about 1 hour, and the resulting mixture was maintained at 120° C. to 130° C. When the acid value lowered to 3 or less, the reaction was stopped.

The thus-prepared compound had an average of 3 epoxy groups and 0.5 acryloyl groups per molecule and the epoxy equivalent of 196. This compound was designated as "Polymerizable Epoxy Group-Containing Compound Mixture I".

EXAMPLE 1

|  | Parts |
| --- | --- |
| Styrene | 50 |
| Methacrylic acid | 15 |
| 2-Hydroxyethyl acrylate | 20 |
| Methyl methacrylate | 10 |
| Azobisisobutyronitrile | 0.5 |
| Total | 95.5 |

These polymerizable monomers were mixed to prepare a polymerizable mixed monomer solution.

A mixture of 139.3 parts of Polymerizable Epoxy Group-Containing Compound A and 100 parts of n-butanol was added to the polymerizable mixed monomer solution, and they were mixed uniformly. Then, 50 parts of the thus-prepared mixture was introduced into a reactor and heated up to 90° C. The residual mixture was added dropwise over a period of about 2 hours. On continuing the reaction for about 5 hours while controlling the temperature at from 80° C. to 100° C., a viscous solution was obtained.

To the viscous solution thus-obtained was added 4 parts of dimethylaminoethanol, and they were mixed uniformly. Then, 331 parts of desalted water was added dropwise over a period of 30 minutes. When the addition of the water was completed, the temperature of the resulting system was 40° C.

The thus-prepared aqueous dispersion was stable and had the following characteristics:

pH: 6.8

Viscosity: 2,400 cps (as determined with Brookfield viscometer at 6 rpm)

A mixture of 662 parts of the aqueous dispersion and 20 parts of a melamine resin (Cymel 303, produced by American Cyanamid Co.) was coated on a tin-free steel plate with a bar coater to obtain a dry thickness of 8 to 10 microns, and baked for about 3 minutes in a dryer maintained at 200° C.

The characteristics of the thus-prepared coating film was as follows:

Folding properties: 2 mm pass

Dupont impact value: 500 g, ½ inch, 50 cm or more

Cross-cut adhesion: 100/100

Cross-cut adhesion after soaking in 100° C. boiling water for 1 hour: 100/100

Folding properties after soaking in 100° C. boiling water for 1 hour: 2 mm pass (The folding property, Dupont impact value, and cross-cut adhesion were measured according to Japanese Industrial Standard JIS K-5400.)

EXAMPLES 2 TO 5

Polymerizable mixed monomer solutions shown in Table 1 were prepared.

TABLE 1

|  | Example No. | | | |
| --- | --- | --- | --- | --- |
|  | 2 | 3 | 4 | 5 |
| Styrene | 30 | 22 | 50 | 50 |
| 2-Hydroxyethyl acrylate | 100 | 10 | 15 | 15 |
| Methyl methacrylate | 40 | 5 | 20 | 20 |
| Acrylic acid | — | — | 10 | — |
| Methacrylic acid | 20 | 10 | — | 10 |
| Azobisisobutyronitrile | 2 | 0.5 | 0.5 | — |
| Benzoyl peroxide | — | — | — | 1 |
| Dimethylaminoethanol | 15 | 7.5 | 7.0 | 7.5 |

A mixture of 136 parts of Polymerizable Epoxy Group-Containing Compound Mixture B and 100 parts of n-butanol was added to the above polymerizable mixed monomer solution (except dimethylaminoethanol) and mixed uniformly. Then, 50 parts of the mixed solution was introduced into a reactor and heated up to 90° C., and the residual mixed solution was added dropwise over a period of about 2 hours. On continuing the reaction for about 5 hours while maintaining the temperature at from 80° C. to 100° C., a viscous solution was obtained.

To the thus-prepared viscous solution there was added dimethylaminoethanol in the amount shown in Table 1, which were then mixed uniformly. Then, desalted water was added over about 30 minutes, so that the water content was about 50%. The characteristics of the thus-prepared aqueous dispersion are shown in Table 2.

A water-soluble methylated urea resin (produced by Mitsuitoatsu Chemicals, Inc.) was added to the aqueous dispersion and mixed uniformly. The mixture thus-prepared was coated on a tin-free steel plate with a bar coater in a dry thickness of 10 microns and baked for about 3 minutes in a dryer maintained at 200° C. The characteristics of the thus-prepared coating film are shown in Table 2.

TABLE 2

|  | Example No. | | | |
| --- | --- | --- | --- | --- |
|  | 2 | 3 | 4 | 5 |
| Characteristics of Aqueous Dispersion: | | | | |
| pH | 6.5 | 6.8 | 6.6 | 6.6 |
| Viscosity (cps) | 1,200 | 5,800 | 1,800 | 1,500 |
| Storage Stability of Aqueous Dispersion (40° C./1 month) | Good* | Good | Good | Good |
| Characteristics of Coating Film: | | | | |
| Composition (parts) | | | | |
| Aqueous Dispersion | 850 | 565 | 662 | 662 |
| Methylated Urea Resin | 20 | 20 | 20 | 20 |
| Folding Properties | 2 mm pass | 2 mm pass | 2 mm pass | 2 mm pass |
| Cross-Cut Adhesion | 100/100 | 100/100 | 100/100 | 100/100 |
| Cross-Cut Adhesion after Soaking in 100° C. Boiling Water for 1 Hour | 100/100 | 100/100 | 100/100 | 100/100 |

*"Good": No aggregation and no sedimentation occurred.

EXAMPLES 6 TO 9

The procedure of Example 1 was repeated, with the exception that Polymerizable Epoxy Group-Containing Compound Mixtures C to F were used in place of Polymerizable Epoxy Group-Containing Compound Mixture A to prepare the corresponding aqueous dispersions shown in Table 3.

TABLE 3

|  | Example No. | | | |
| --- | --- | --- | --- | --- |
|  | 6 | 7 | 8 | 9 |
| Composition: | | | | |
| Polymerizable Epoxy Group-Containing Compound Mixture C | 141 | — | — | — |
| Polymerizable Epoxy Group-Containing Compound Mixture D | — | 244 | — | — |
| Polymerizable Epoxy Group-Containing Compound Mixture E | — | — | 139 | — |
| Polymerizable Epoxy Group-Containing Compound Mixture F | — | — | — | 137 |
| Styrene | 50 | 50 | 50 | 50 |
| Methacrylic Acid | 15 | 15 | 15 | 15 |
| 2-Hydroxyethyl Acrylate | 20 | 20 | 20 | 20 |
| Methyl Methacrylate | 10 | 10 | 10 | 10 |
| Azobisisobutyronitrile | 0.5 | 0.5 | 0.5 | 0.5 |
| n-Butanol | 100 | 100 | 100 | 100 |
| Water Content (%) | 50 | 50 | 50 | 50 |
| Characteristics of Aqueous Dispersion: | | | | |
| pH | 7.2 | 6.5 | 6.3 | 6.2 |
| Viscosity | 2,200 | 8,500 | 1,800 | 600 |
| Storage Stability (40° C./1 month) | Good | Good | Good | Good |

EXAMPLE 10

|  | Parts |
| --- | --- |
| Polymerizable Epoxy Group-Containing Compound Mixture D | 70 |
| Methacrylic acid | 13 |
| Styrene | 13 |
| n-Butyl acrylate | 6 |
| Azobisisobutyronitrile | 1.2 |
| Butyl cellosolve | 98.8 |
| Total | 200 |

These polymerizable ingredients were mixed to prepare a polymerizable mixed monomer solution. 100 parts of the mixed solution was introduced into a reactor and heated up to 85° C. Then, the residual mixed solution was added dropwise over a period of about 4 hours. On continuing the reaction for 2 hours after the dropwise addition of the residual mixed solution while maintaining the temperature at 85° to 95° C., a viscous solution was obtained.

The viscosity of the thus-prepared viscous solution at 50° C. was about 500 poises as determined with a Model B viscometer (produced by Tokyo Keiki Company).

Subsequently, 2 parts of diethylaminoethanol was added to the viscous solution and mixed uniformly. Then, 150 parts of desalted water was added dropwise to the mixture over a period of about 30 minutes. When the addition of water was completed, the temperature of the resulting system was 40° C. The thus-obtained aqueous dispersion was stable and had the following characteristics:

pH: 6.8
Viscosity: 250 cps (as determined with Brookfield viscometer at 30 rpm)
Maximum frequency grain size of aqueous dispersion: 0.6 microns
Storage stability test at 50° C. (7 days): Good The above prepared aqueous dispersion was coated on a tin plate with a bar coater in a dry thickness of 8 to 10 microns, and baked for about 3 minutes in a dryer maintained at 205° C. The characteristics of the thus-obtained coating film were as follows:

Folding properties: 2 mm pass
Acetone rubbing test*: 100 times
Dupont impact value: 500 g, ½ inch, 50 cm or more
Cross-cut adhesion: 100/100
Cross-cut adhesion after soaking in 100° C. boiling water for 1 hour: 100/100
Folding properties after soaking in 100° C. boiling water for 1 hour: 2 mm pass
* Number of times necessary to remove the coated film with an acetone-impregnated gauze to expose the tin plate was measured.

COMPARATIVE EXAMPLES 1 TO 3

Comparative polymerizable mixed monomer solutions were prepared as shown in Table 4.

TABLE 4

|  | Comparative Example No. | | |
| --- | --- | --- | --- |
|  | 1 | 2 | 3 |
| Composition: | | | |
| Methacrylic acid | 13 | 13 | 13 |
| Styrene | 13 | 13 | 13 |
| n-Butyl acrylate | 6 | 6 | 6 |
| A.E.R.-667 | — | 70 | 70 |
| Azobisisobutyronitrile | 1.2 | 1.2 | — |

TABLE 4-continued

|  | Comparative Example No. | | |
| --- | --- | --- | --- |
|  | 1 | 2 | 3 |
| Benzoyl peroxide | — | — | 1.5 |
| Butyl cellosolve | 28.8 | 98.8 | 98.5 |
| Reaction Temperature (°C.) | 80–90 | 80–90 | 120–125 |
| Diethylaminoethanol (parts) | 2 | 2 | 2 |
| Characteristics of Aqueous Dispersion: | | | |
| pH | 6.7 | 6.6 | 6.8 |
| Viscosity | 500 | 100 | 150 |
| Grain size distribution median (μ) | 0.3 | 1.5 | 1.2 |
| Stability at 50° C. (7 days) | Good | Precipitation | Precipitation |

Using the above comparative polymerizable mixed monomer solutions, corresponding aqueous dispersions were prepared in the same manner as in Example 10. The aqueous dispersions prepared in Comparative Examples 2 and 3 had large grain sizes and their stability at 50° C. was poor.

Each of the aqueous dispersions prepared in Comparative Examples 1 to 3 was coated on a tin plate with a bar coater in a dry thickness of 8 to 10 microns, and baked for about 3 minutes in a dryer maintained at 205° C. The characteristics of the thus-obtained coating film are shown in Table 5.

TABLE 5

|  | Comparative Example No. | | |
| --- | --- | --- | --- |
|  | 1 | 2 | 3 |
| Folding properties | 2 mm pass | 2 mm out | 2 mm pass |
| Acetone rubbing test (times) | 3 | 20 | 35 |
| Dupont impact (500 g, ½ inch) | more than 50 cm | more than 50 cm | more than 50 cm |
| Cross-cut adhesion | 100/100 | 100/100 | 100/100 |
| Cross-cut adhesion after soaking in 100° C. boiling water for 1 hour | 0/100 | 100/100 | 100/100 |
| Folding properties after soaking in 100° C. boiling water for 1 hour | 2 mm out | 2 mm out | 2 mm out |

EXAMPLE 11

|  | Parts |
| --- | --- |
| Polymerizable Epoxy Group-Containing Compound Mixture G | 50 |
| Styrene | 20 |
| n-Butyl acrylate | 20 |
| Methyl methacrylate | 10 |
| Polyoxyethylene lauryl ether (Hydrophilic-Lipophilic Balance (HLB): 17.5) | 2 |
| Sodium dicyclohexylsulfosuccinate | 2 |
| Ammonium persulfate | 2 |
| Desalted water | 50 |
| Total | 156 |

These polymerizable ingredients were mixed to prepare a polymerizable mixed monomer emulsion.

A solution of 1 part of a polymerization initiator, ammonium persulfate (hereinafter referred to as "APS") in 50 parts of desalted water was heated up to 70° C. To the aqueous solution there was added dropwise the above-prepared mixed emulsion over a period of about 2 hours while maintaining the temperature at from 70° C. to 75° C. After the dropwise addition was completed, the resulting mixture was maintained at the above temperature for 2 hours. Then, 2 parts of APS was added thereto, and the mixture was heated up to from 80° C. to 85° C. and maintained at the temperature for 2 hours.

The thus-prepared aqueous dispersion was a milk white emulsion having an average grain size of 0.2μ, a pH of 6.1, and a viscosity (as determined with Model B viscometer) of 200 cps. When the aqueous dispersion was subjected to a stability test by allowing it to stand at 50° C. for 3 months, no deterioration was observed.

Then, 2 parts of diethylenetriamine (hereinafter referred to as "DETA") was added to the aboveprepared aqueous dispersion and mixed uniformly. The mixture thus-prepared was coated on a mild steel plate in a dry thickness of 100 microns and dried at room temperature for 1 week to provide a coating film. The characteristics of the coating film were as follows:

Surface state of coating film: Uniform and transparent
Erichsen cupping (DIN 53,156): 8 mm or more
Dupont impact value: 500 g, ½ inch, 50 cm or more
Cross-cut adhesion: 100/100
Cross-cut adhesion after soaking in water at 25° C. for 1 week: 100/100

COMPARATIVE EXAMPLE 4

An aqueous dispersion was prepared in the same manner as in Example 11 except that an unmodified epoxy resin A.E.R.-331 was used in place of Polymerizable Epoxy Group-Containing Compound Mixture G.

The thus-prepared aqueous dispersion was a white emulsion having an average grain size of 0.5 micron, a pH of 6.2, and a viscosity of 100 cps. When the aqueous dispersion was subjected to a stability test by allowing it to stand at 50° C., separation occurred in about 3 weeks.

Immediately after the preparation of the aqueous dispersion, 3 parts of DETA was added to the aqueous dispersion and uniformly mixed. The mixture was coated on a mild steel plate to obtain a coating film having a dry thickness of 100 microns. The characteristics of the coating film are as follows:

Surface state of coating film: Turbid
Erichsen cupping: 8 mm or more
Dupont impact value: 500 g, ½ inch, 50 cm or more
Cross-cut adhesion: 100/100
Cross-cut adhesion after soaking in water at 25° C. for 1 week: 0/100

EXAMPLES 12 TO 14

Polymerizable mixed monomer emulsions having the compositions shown in Table 6 were prepared.

A solution of 1 part of potassium persulfate (hereinafter referred to as "KPS") in 50 parts of desalted water was heated up to 80° C. To the aqueous solutions there was added dropwise each polymerizable mixed monomer emulsion as prepared above, over a period of about 2 hours. After the dropwise addition was completed, the temperature was maintained at 80° C. for about 3 hours. Then, 2 parts of KPS was added to the mixture, and the reaction was continued for 2 hours.

All of the thus-prepared aqueous dispersions were milk white stable emulsions.

TABLE 6

|  | Example No. | | |
| --- | --- | --- | --- |
|  | 12 | 13 | 14 |
| Polymerizable Epoxy Group-Containing | 70 | 30 | 50 |

TABLE 6-continued

|  | Example No. | | |
| --- | --- | --- | --- |
|  | 12 | 13 | 14 |
| Compound Mixture G |  |  |  |
| Styrene | 10 | 20 | 20 |
| n-Butyl acrylate | 10 | 20 | 20 |
| Methyl methacrylate | 5 | 20 | — |
| Acrylamide | 2 | 2 | — |
| Methacrylic acid | 3 | 8 | 10 |
| Polyoxyethylene luaryl ether (HLB = 17.5) | 2 | 2 | — |
| Sodium dicyclohexylsulfosuccinate | 2 | 2 | 2 |
| Propylene oxide-ethylene oxide block copolymer | — | — | 2 |
| KPS (HLB = 16.3) | 1 | 1 | 1 |
| Desalted water | 51 | 51 | 51 |

EXAMPLE 15

To 100 parts of each aqueous dispersion prepared in Examples 12-14 were added 20 parts of $TiO_2$ (rutile), 15 parts of talc, 15 parts of coal powder, and 5 parts of ethyl cellosolve to prepare a uniform dispersion. Then, a polyamidoamine-based hardener, Sunmide S17-02 (produced by Sanwa Chemical Co., Ltd.) was added to the dispersion and mixed. Each mixture thus-prepared was coated on a slate plate to obtain a layer having a dry thickness of 500 microns.

It took 3 hours for each coating film to dry to the touch. After one day, the coating film was dried sufficiently, and the cross-cut adhesion was 100/100. After the coating film was soaked in water at 25° C. for 10 days, the cross-cut adhesion was again examined, and it was found that the cross-cut adhesion was still 100/100 and the coating film had a sufficient adhesion force.

EXAMPLES 16 AND 17

Using the compositions shown in Table 7, the corresponding aqueous dispersions were prepared in the same manner as in Example 11.

TABLE 7

|  | Example 16 | Example 17 |
| --- | --- | --- |
| Polymerizable Epoxy Group-Containing Compound Mixture B | 50 | 0 |
| Polymerizable Epoxy Group-Containing Compound Mixture C | 0 | 50 |
| Styrene | 20 | 20 |
| n-Butyl acrylate | 20 | 20 |
| 2-Hydroxyethyl acrylate | 10 | 10 |
| Polyoxyethylene lauryl ether (HLB = 17.5) | 2 | 2 |
| APS | 1 | 1 |
| Desalted water | 51 | 51 |

All the aqueous dispersions were milk white and stable emulsions.

EXAMPLE 18

To 200 parts of the aqueous dispersion prepared in Example 11 was added 6 parts of triethylenetetramine (hereinafter referred to as "TETA") as a hardener and mixed uniformly to prepare a contact adhesive. The pot-life of the adhesive was 4 hours.

The thus-prepared adhesive was coated on two plywood sheets in a dry thickness of 30 microns and was allowed to stand for 10 minutes. At the end of that time, the two plywood sheets were bonded together under a pressure of 3 kg/cm² for about 5 seconds.

The tensile shear adhesion strength just after bonding was measured and found to be 5 kg/cm² (green strength).

After the bonding, the adhesion strength increased with the lapse of time. The tensile shear adhesion strength after about one day was 40 kg/cm².

EXAMPLE 19

To 200 parts of the emulsion polymer prepared in Example 11 were added 50 parts of an aqueous phenol resin dispersion (non-volatile content 50%; produced by Showa Union Co., Ltd.) and 3 parts of 2-ethyl-4-methylimidazole as a hardener to prepare a contact adhesive. The pot-life of the adhesive was 40 hours or more.

The adhesive was coated on an asbestos slate and a cotton canvas to obtain a dry thickness in each case of 30 microns, and was allowed to stand for 5 minutes. At the end of that time, the asbestos slate and the cotton canvas were bonded together under a pressure of 1 kg/cm² for about 2 seconds, and the green strength was 10 kg/cm².

EXAMPLE 20

|  | Parts |
| --- | --- |
| Styrene | 10 |
| n-Butyl acrylate | 20 |
| Methyl methacrylate | 10 |
| Polyoxyethylene lauryl ether (HLB = 18.1) | 2 |
| Sodium dicyclohexylsulfosuccinate | 2 |
| Ammonium persulfate | 2 |
| Polymerizable Epoxy Group-Containing Compound Mixture G | 50 |
| Hycar CTBN 1300 × 13 (nitrile-butadiene rubber having a molecular weight of 3,500, produced by Ube Industries Ltd.) | 10 |
| Desalted water | 30 |

These ingredients were mixed to prepare a polymerizable emulsion.

The polymerizable emulsion was subjected to emulsion polymerization in the same manner as in Example 11 to prepare an emulsion polymer. The average grain size of the emulsion polymer was 0.1 micron, and it was stable for 30 days at 40° C.

To 200 parts of the emulsion polymer there was added 2 parts of TETA and mixed uniformly to prepare a contact adhesive. The pot-life of the adhesive was 12 hours.

While the invention has been described in detail and with reference to specific embodiments thereof, it will be apparent to one skilled in the art that various changes and modifications can be made therein without departing from the spirit and scope thereof.

What is claimed is:

1. An aqueous dispersion composition which is prepared by uniformly mixing
   (A) a mixture of aromatic compounds having epoxy groups and/or acryloyl or methacryloyl groups, said mixture containing an average of at least 0.5 epoxy groups and an average of from 0.1 to 1.5 acryloyl or methacryloyl groups per molecule, which mixture is prepared by reacting an aromatic epoxy resin with at least one of acrylic acid and methacrylic acid, and
   (B) at least one ethylenic monomer, and then polymerizing the mixture; wherein the epoxy groups remain in said dispersion composition in an amount sufficient to cause a cross-linking reaction, wherein the weight ratio of (A) to (B) is from 90/10 to 10/90.

2. A composition as in claim 1, wherein (B) contains acrylic acid or methacrylic acid.

3. A composition as in claim 2, wherein the mixture is polymerized by a solution polymerization method.

4. A composition as in claim 3, wherein the epoxy equivalent of (A) is from 100 to 10,000.

5. A composition as in claim 1, wherein the aromatic epoxy resin is a condensate of bisphenol A and epichlorohydrin.

6. A composition as in claim 3, wherein the solution polymerization is performed at a temperature of from 70° C. to 100° C.

7. A composition as in claim 2, wherein the polymerization is an emulsion polymerization.

8. A composition as in claim 7, wherein the epoxy equivalent of (A) is from 100 to 10,000.

9. A composition as in claim 1, wherein (A) is a condensate of bisphenol A and epichlorohydrin.

10. An aqueous dispersion composition comprising:
   (I) an aqueous dispersion which is prepared by uniformly mixing
   (A) a mixture of aromatic compounds having epoxy groups and/or acryloyl or methacryloyl groups, said mixture containing an average of at least 0.5 epoxy groups and from 0.1 to 1.5 acryloyl or methacryloyl groups per molecule, which mixture is prepared by reacting an aromatic epoxy resin with at least one of acrylic acid and methacrylic acid, and
   (B) at least one ethylenic monomer, and then polymerizing the mixture; and
   (II) a polyamine-based or polysulfide-based hardener; wherein the epoxy groups remain in said dispersion composition in an amount sufficient to cause a crosslinking reaction, wherein the weight ratio of (A) to (B) is fromm 90/10 to 10/90.

11. A composition as in claim 10, wherein the mixture is polymerized by an emulsion polymerization method.

12. A composition as in claim 11, wherein the epoxy equivalent of (A) is from 100 to 2,000.

13. A composition as in claim 10, wherein the aromatic epoxy resin is a condensate of bisphenol A and epichlorohydrin.

14. A composition as in claim 11, wherein the polyamine-based hardener is added in such an amount that the active hydrogen of the polyamine-based hardener is from 0.1 to 2.0 equivalents per equivalent of epoxy group in the aqueous dispersion (I).

15. An aqueous dispersion composition comprising:
   (I) an aqueous dispersion which is prepared by uniformly mixing
   (A) a mixture of aromatic compounds having epoxy groups and/or acryloyl or methacryloyl groups, said mixture having an average of at least 0.5 epoxy groups and from 0.1 to 1.5 acryloyl or methacryloyl groups per molecule, which mixture is prepared by reacting an aromatic epoxy resin with at least one of acrylic acid and methacrylic acid, and
   (B) at least one ethylenic monomer, and then polymerizing the mixture, wherein the weight ratio of (A) and (B) is from 90/10 to 10/90;
   (II) at least one resin selected from the group consisting of a phenol resin, a terpene resin, a rosin gum, a rosin ester resin, and a xylene resin; and
   (III) a polyamine-based hardener; wherein the epoxy groups remain in said dispersion composition in an amount sufficient to cause a crosslinking reaction.

16. A composition as in claim 15, wherein the mixture is polymerized by an emulsion polymerization method.

17. A composition as in claim 16, wherein the epoxy equivalent of the aromatic compound is from 100 to 2,000.

18. A composition as in claim 15, wherein the aromatic epoxy compound is a condensate of bisphenol A and epichlorohydrin.

19. A composition as in claim 15, wherein the polyamine-based hardener is added in such an amount that the active hydrogen of the polyamine-based hardener is from 0.1 to 2.0 equivalents per equivalent of the epoxy group in the aqueous dispersion (I).

20. A composition as in claim 1, 14, or 19, wherein the mixture of aromatic compounds has an average of from 0.4 to 0.8 acryloyl or methacryloyl groups per molecule.

21. A composition as in claim 1, 14, or 19, wherein the ethylenic monomer contains about 1% to 60% by weight of acrylic acid or methacrylic acid.

* * * * *